US009191488B2

(12) United States Patent
Savino

(10) Patent No.: US 9,191,488 B2
(45) Date of Patent: Nov. 17, 2015

(54) INTERACTIVE ELECTRONIC DEVICE PACKAGING ASSEMBLIES, METHODS, AND SYSTEMS

(71) Applicant: Motorola Mobility LLC, Libertyville, IL (US)

(72) Inventor: Frank V Savino, San Carlos, CA (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 87 days.

(21) Appl. No.: 14/174,534

(22) Filed: Feb. 6, 2014

(65) Prior Publication Data

US 2015/0072743 A1  Mar. 12, 2015

Related U.S. Application Data

(60) Provisional application No. 61/874,716, filed on Sep. 6, 2013.

(51) Int. Cl.
*H04M 1/725* (2006.01)
*H04M 1/02* (2006.01)
*A45C 11/00* (2006.01)

(52) U.S. Cl.
CPC ........ *H04M 1/72569* (2013.01); *H04M 1/0254* (2013.01); *H04M 1/72575* (2013.01); *A45C 11/00* (2013.01); *H04M 1/72527* (2013.01); *H04M 2250/04* (2013.01)

(58) Field of Classification Search
CPC ..... G01D 5/2515; G01D 11/245; H04B 1/034
USPC ............... 455/128, 575.1, 575.3, 575.4, 90.3; 206/459.1
See application file for complete search history.

(56) References Cited

U.S. PATENT DOCUMENTS

| | | | | |
|---|---|---|---|---|
| 3,556,337 A * | 1/1971 | Harmon et al. | ............... | 220/315 |
| 4,126,220 A * | 11/1978 | Roccaforte | ................... | 206/782 |
| 4,711,348 A * | 12/1987 | Schluger | ................... | 206/45.29 |
| RE33,503 E * | 12/1990 | Schluger | ................... | 206/45.29 |
| 6,298,990 B1 | 10/2001 | Amrod et al. | | |
| 2008/0169343 A1* | 7/2008 | Skaaksrud et al. | ............ | 235/376 |
| 2013/0321857 A1* | 12/2013 | Asay et al. | ................... | 358/1.15 |
| 2014/0097122 A1* | 4/2014 | Patterson et al. | ............. | 206/758 |
| 2014/0138275 A1* | 5/2014 | Magnusson et al. | ....... | 206/459.1 |
| 2015/0106296 A1* | 4/2015 | Robinson et al. | ............. | 705/339 |

OTHER PUBLICATIONS

Edgar Davin of big DAWGSpromotions, "DIY/How To: Make a Musical Greeting Card (with sound module)", https://www.youtube.com/watch?v=XDkzTbf4EEc, Jan. 14, 2012, 2 pages.
Pottery Barn Kids, "Abigail Small Jewelry Box", http://www.potterybarnkids.com/products/abigail-small-jewelry-box/, accessed Feb. 6, 2014, 3 pages.

* cited by examiner

*Primary Examiner* — Minh D Dao
(74) *Attorney, Agent, or Firm* — Marshall, Gerstein & Borun LLP

(57) ABSTRACT

Interactive electronic device packaging assemblies, methods, and systems change the operational state of a packaged electronic device, for example activating a mobile phone, in response to opening of the retail package. In one embodiment, the retail package includes a hall-effect sensor mounted on one portion, a magnet mounted on another portion, and an audio playback circuit that plays prerecorded audio when the portions are separated during opening. In another embodiment, the audio playback circuit can be coupled to an audio output of the electronic device, enabling the package to function as an external loudspeaker. And in yet another embodiment, the package includes a pull-out drawer for storing accessories, such as a manual, earphones, AC adapter, USB cable, and so forth.

26 Claims, 9 Drawing Sheets

INTERACTIVE ELECTRONIC DEVICE PACKAGING ASSEMBLIES, METHODS, AND SYSTEMS

TECHNICAL FIELD

Various embodiments disclosed herein concern packaging for electronic devices, particularly packaging for mobile telephones.

BACKGROUND

In 2012 more than 1.5 billion mobile phones were sold across the world. Many, if not most, of these were packaged in some form of cardboard box, typically including a set of instructions, and one or more accessories, such as an AC adapter and headphones, in addition to the phone itself. Aside from simple containment, the packaging serves primarily to identify and brand the phone, and to protect it during shipping and handling.

The experience of opening or unboxing a mobile phone has become a relatively commonplace and unremarkable, with most packaging discarded soon after purchase and adding little value to the experience of purchasing or using the phone. There is an opportunity to create alternative forms of electronic device packaging generally, and mobile phone packaging particularly, that provide an entertaining and useful introduction to the electronic device.

BRIEF DESCRIPTION OF THE DRAWINGS

Various embodiments are described below with reference to the following attached figures, none of which are drawn to scale. These figures show various features and components that are annotated with reference numbers, and these numbers are used in the following description as a teaching aid, with like numbers referring to the same or similar features and components.

DETAILED DESCRIPTION

Overview

To address one or more of the above-noted opportunities and/or other problems with conventional electronic device packaging, and mobile device packaging in particular, the interactive electronic device packaging assemblies, methods, and systems change an operational state of a packaged electronic device in response to the packaging being opened. In one aspect, the operational state of a digital display of the packaged electronic device goes from an off or standby state to an on or active state in response to the retail package opening. In another aspect, the operational state of an audio, video, or audio-visual player of the packaged electronic device goes from an off or standby state to an on or active state in response to the retail package opening.

In one embodiment, the packaging includes a hall-effect sensor or reed switch mounted on one portion, a magnet mounted on another portion, and circuitry that communicates a wake-up signal to the packaged electronic device, for example a mobile telephone, when the hall-effect sensor or reed switch detects movement of the magnet as the packaging portions are separated during opening. In some embodiments, the hall-effect sensor or reed switch also activates an audio playback circuit, causing playback of prerecorded audio stored in memory. In another embodiment, the audio playback circuit can be coupled to an audio output port of the electronic device, enabling the package to function as an external loudspeaker for the packaged electronic device.

And in yet another aspect, the package includes a pull-out drawer for storing accessories for the electronic device, such as a user manual, earphones, AC adapter, USB cable, and so forth.

Example Assembly or System

Figure 1:
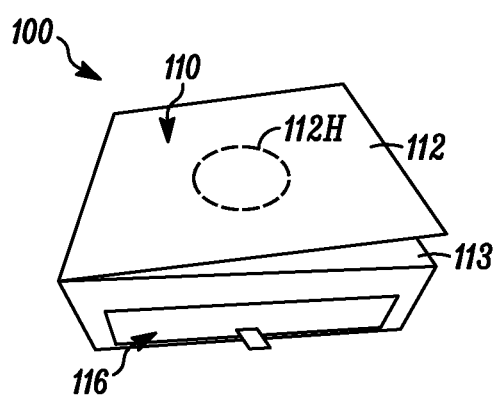
FIG. 1 is a perspective view of an example electronic device packaging system or assembly in a substantially closed configuration corresponding to one or more embodiments.
Figure 2:
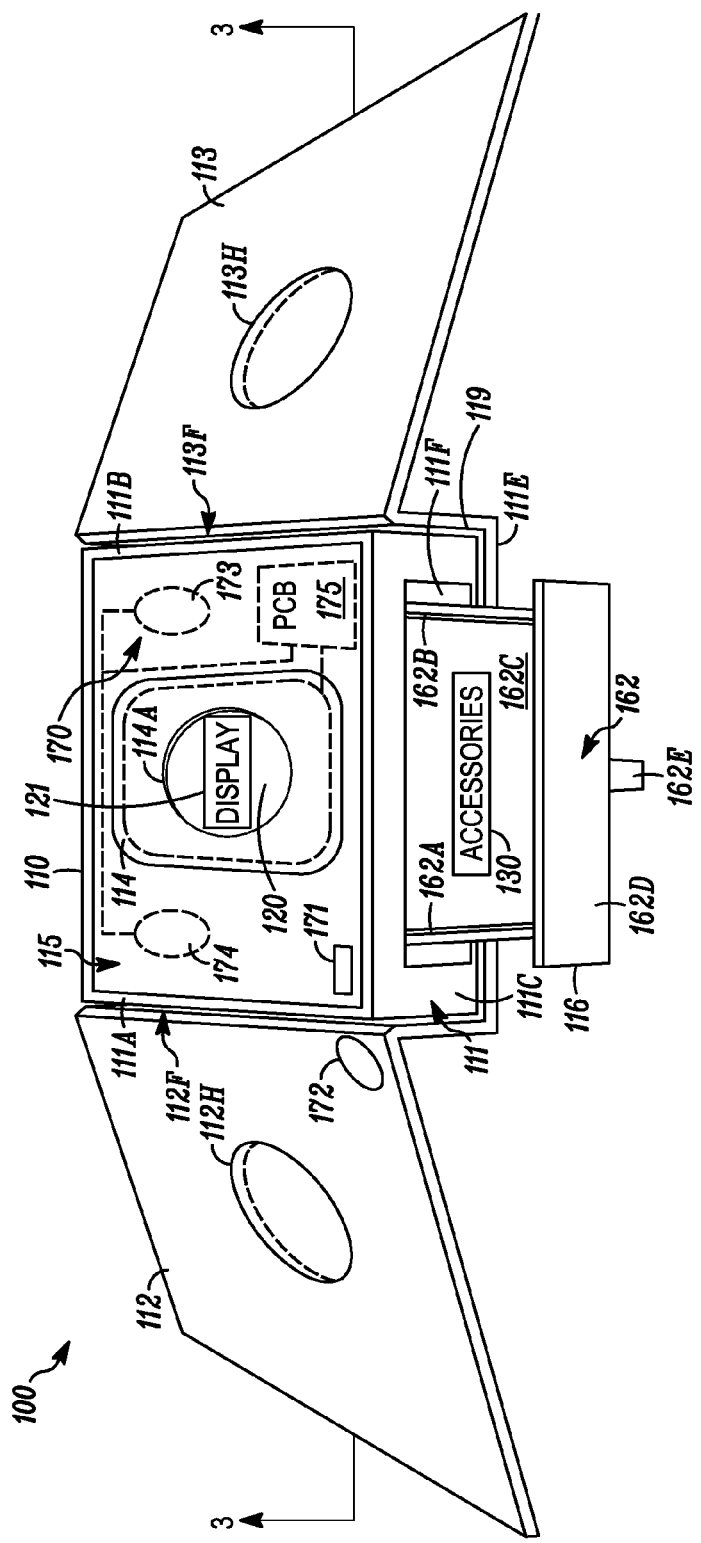
FIG. 2 is a perspective view of the FIG. 1 system or assembly in an open configuration corresponding to one or more embodiments.
Figure 3:
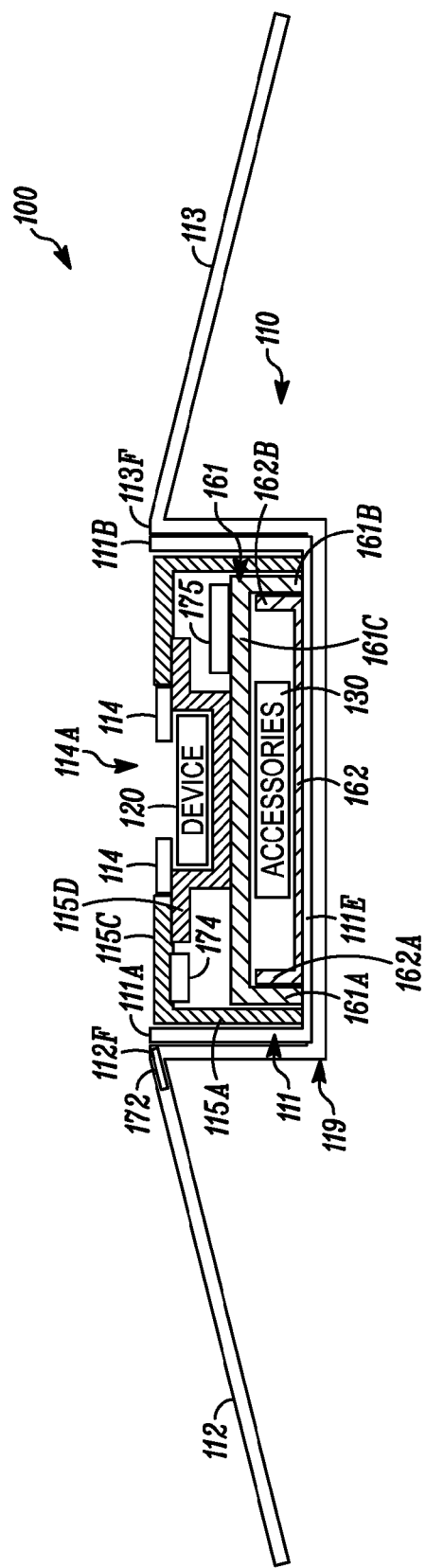
FIG. 3 is a cross-sectional view of the FIG. 1 assembly through line 3-3 in FIG. 2 and thus also corresponding to one or more embodiments.
Figure 4:
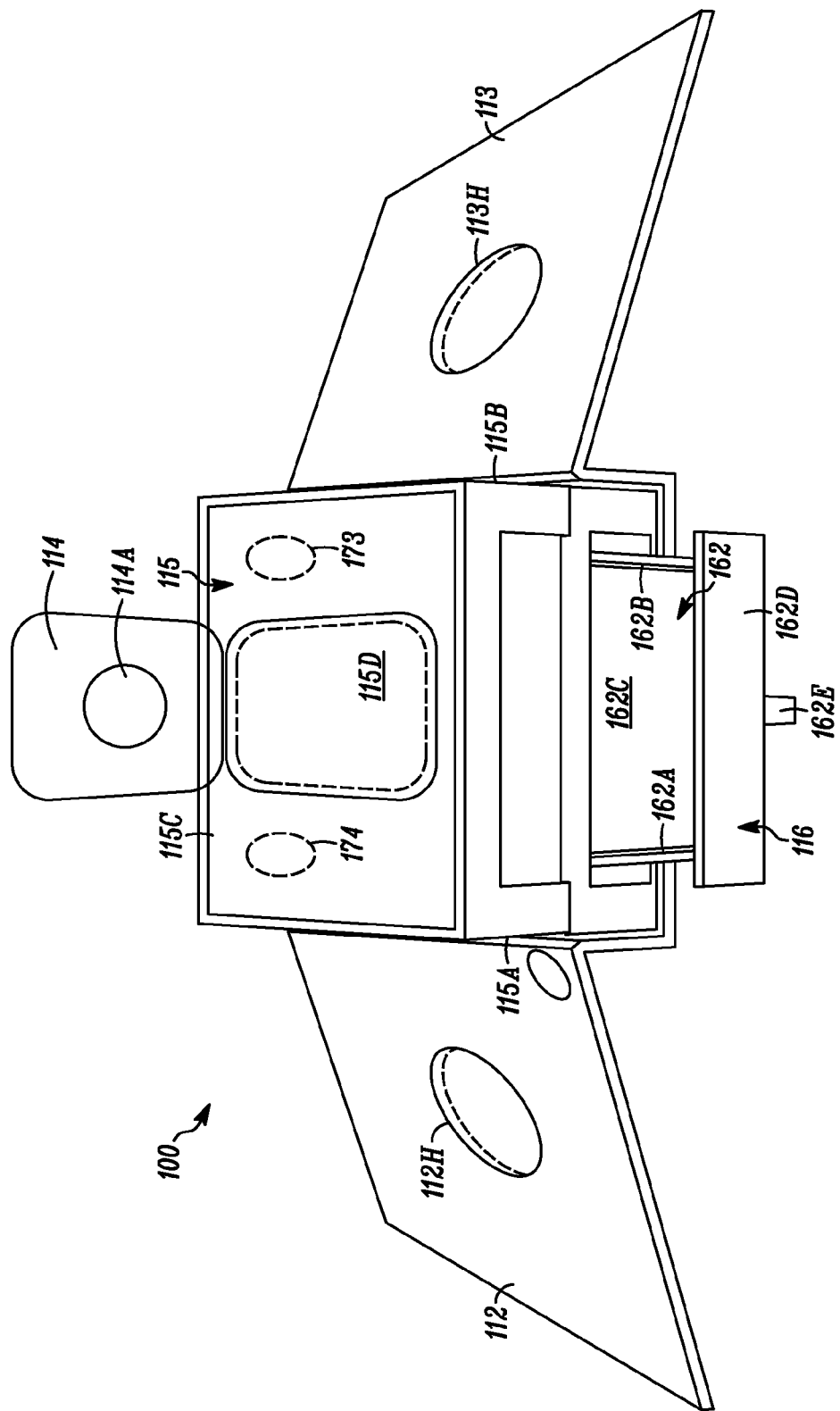
FIG. 4 is a partially exploded perspective view of the FIG. 1 assembly in an open configuration corresponding to one or more embodiments.

FIG. 1 shows a perspective view of an example electronic device packaging assembly 100 in a partially closed configuration. FIG. 2 shows assembly 100 in an open configuration, and FIG. 3 shows a cross-sectional view of assembly 100 taken at line 3-3 in FIG. 2. FIG. 4 shows a partially exploded perspective view of the FIG. 1 assembly, corresponding to one or more embodiments, in an open configuration with a device tray lifted up from its assembled position and a drawer assembly opened.

More particularly, assembly 100 includes a package 110, a packaged electronic device 120, and accessories 130. Package 110 includes a container portion 111, lid portions 112 and 113, a device cover flap 114, a device tray 115, a drawer assembly 116, and interactive playback circuitry 170. Container portion 111, which takes the form of an open-top cardboard or plastic box, includes four sides 111A-D and a bottom 111E. Extending outward from sides 111A and 111B respectively are flap or lid portions 112 and 113.

Lid portions 112 and 113, which join to opposing sides of an intermediate wrap portion 119 that is adhered to sides 111A and 111B and bottom 111E, include respective creases, folds, or hinges 112F and 113F and respective optional holes or openings 112H and 113H. Lid portions 112 and 113 can be manually pivoted toward each other about the respective creases or hinges 112F and 113F, with lid portion 112 overlapping or closing over lid portion 113, as shown in FIG. 1. In this closed position, holes or openings 112H and 113H, similarly sized circular openings in this example, register with each other and with a similar circular opening 114A in device cover flap 114. Device cover flap 114 overlays the packaged electronic device 120, with opening 114A exposing at least part of the electronic device's touch-screen or non-touch-screen display 121. With the optional openings 112H and 113H in registration with opening 114A, display 121 is visible through lid portions 112 and 113. Some embodiments position a right rectangular sleeve (not shown), which also has an opening in registration with openings 112H and 113H, over the closed packaging. In the example embodiment, device 120 takes the form of a mobile phone; however, in other embodiments, it takes the form of a tablet computer, media playback device, personal digital assistant, handheld navigation device, global positioning receiver, gaming system, or remote controller. Device 120 is supported in the packaging assembly 100 by device tray 115.

Device tray 115, shown best in the FIG. 3 cross-section (taken along line 3-3 in FIG. 2 and the partial exploded view in FIG. 4) includes sides 115A and 115B and a top 115C. Side 115A is positioned adjacent to an interior surface of side 111A, and side 115B is positioned adjacent to an interior surface of side 111B. Top 115C includes a recess 115D, which functions as a device receiving area. Recess 115D, in this example embodiment, takes a size, shape, and depth substantially similar to that of electronic device 120, thereby restricting movement of the device within the recess and the package as a whole when lid portions 112 and 113 are closed. Note that this implementation does not include a device cover flap 114 and thus the entire electronic device 120 including the display 121 may be exposed after the lid portions 112, 113 are opened.

Below device tray 115 is drawer assembly 116 with drawer 162. Drawer assembly 116 includes a drawer guide channel 161 (shown best in FIG. 3) and a drawer 162. Drawer guide channel 161 includes left and right sides 161A and 161B which are joined by an intermediate top portion 161C. Sides 161A and 161B are spaced apart sufficiently to contact respective sides 115A and 115B of device tray 115.

The drawer 162 of the drawer assembly 116, which takes the form of a rectangular tray in the example embodiment and extends through an opening 111F in container portion 111, includes respective left and right sides 162A and 162B, a bottom 162C, a front face 162D, and a drawer pull tab 162E. Sides 162A and 162B slideably engage respective side portions of 161A and 161B of drawer guide channel 161, and bottom 162C slideably engages an adjacent interior surface of container bottom 111E. Front face 162D, shown best in FIG. 2, has a one or more of its width or length dimension greater than the corresponding dimensions of opening 111F, thereby preventing users from pushing drawer 162 through opening 111F depending on a depth of the guide channel. Drawer pull tab 162E, formed for example of a fabric or plastic, is adhered to and extends outward from front face 162D, facilitating opening of drawer 162 to access accessories 130. In the example embodiment, accessories 130 include one or more devices or articles of manufacture for use with electronic device 120, such as instruction manuals, earphones, USB (Universal Serial Bus) cables, memory cards, flash drives, and AC adapters. In some embodiments, drawer 162 includes dividers, which define two or more organizational compartments for the accessories.

Interactive playback circuitry 170 includes a sensor 171, a magnet 172, shaker speakers (more generally audio transducers) 173 and 174, a printed circuit board 175. Sensor 171, which takes the form of a hall-effect sensor or reed switch in the example embodiment, is positioned on the underside of a central panel 115C of device tray 115, such that it may sense a change in position relative to magnet 172. Magnet 172 is positioned on a corresponding region of lid portion 112, such that movement of lid portion 112 moves magnet 172 and thus changes the magnetic flux sensed by sensor 171. (Some embodiments use a near field communications (NFC) tag and NFC sensor in place of the magnet and sensor.) Sensor 171 is coupled to PCB 175.

PCB 175 includes circuitry (not visible in this view) that responds to a perceived decrease in magnetic flux (or corresponding change in voltage or current) relative to a threshold level to send a status-change signal to the packaged electronic device 120 (or a contact node for connection to device 120), thereby changing its operational status. In the example embodiment, the status-change signal takes the form of 4.5-volt DC wake-up or startup signal that changes the status of a mobile phone from an inactive or standby status or condition to an active or non-standby status or condition. Additionally, the PCB 175 circuitry in the example embodiment responds to perceived decrease in magnetic flux by initiating playback of a stored digital audio recording through shaker speakers (audio transducers) 173, 174 mounted to the underside of the central panel 115C of device tray 115. Moreover, in the example embodiment, PCB 175 includes one or more batteries, for example 3 AAA batteries to supply 4.5 volts, and amplifier circuits for receiving and amplifying an audio signal from the electronic device 120 as described in more detail with reference to FIG. 9.

Figure 5:
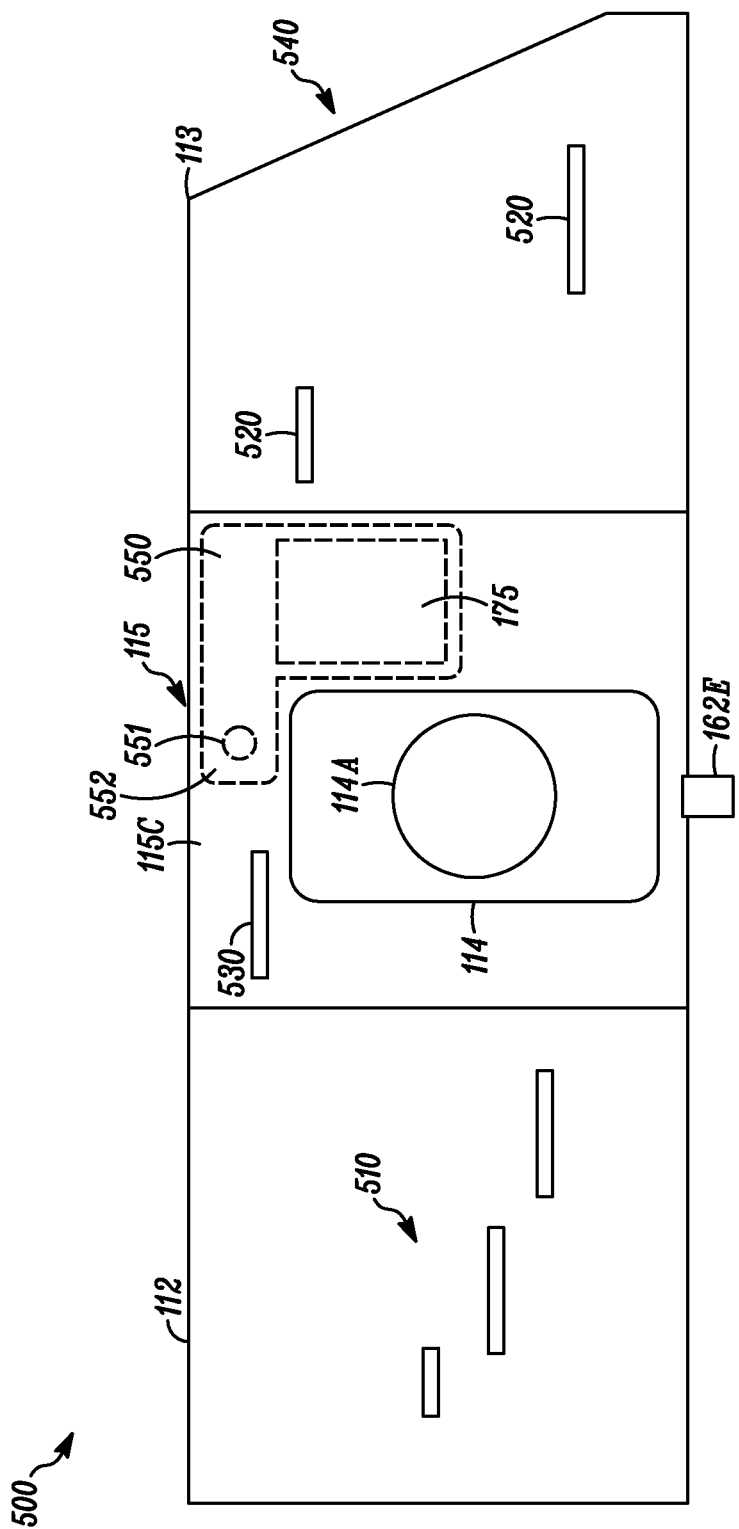
FIG. 5 is a plan view of an alternative electronic device packaging assembly or system corresponding to one or more embodiments.
Figure 6:
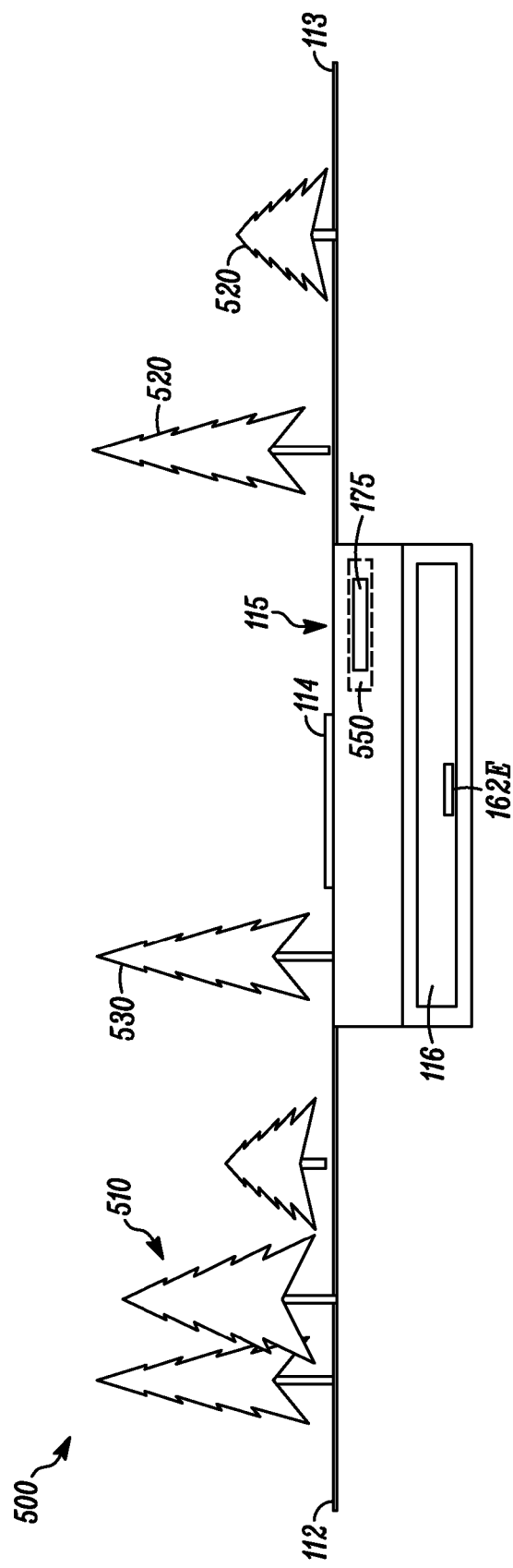
FIG. 6 is a front elevation view of the FIG. 5 assembly or system corresponding to one or more embodiments.

FIGS. 5 and 6 show respective top and front elevation views of an alternative electronic device packaging assembly 500. Assembly 500 is similar to assembly 100, with the inclusion of tree-type pop-up elements 510 and 520 on lid portions 112 and 113 and tree-type pop-up element 530 on device tray 115. Of course, other decorative elements, including other types of pop-up elements, may enhance the user's experience when opening the retail packaging. Note that lid portion 113 also includes a notch 540 to allow for fold-up of pop-up elements 530 prior to opening of lid portion 113. Additionally, assembly 500 includes an L-shaped plastic housing 550 which houses PCB 175 as well as a set of one or more batteries 551. Housing 550 also includes a snap or screw-on battery door 552 which provides access to batteries 551 at a backside of the package.

Figure 7:
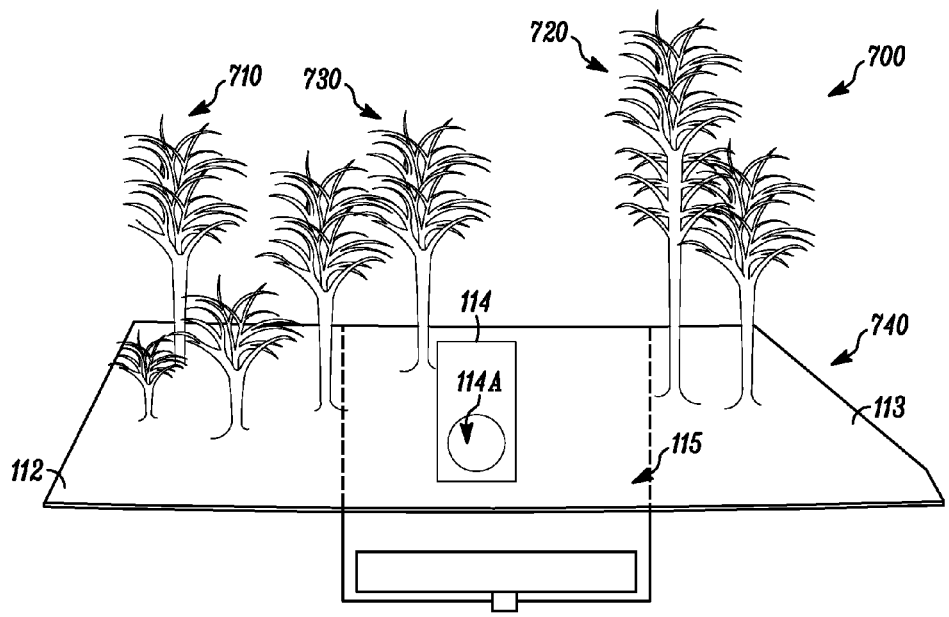
FIG. 7 is a perspective view of an alternative electronic device packaging assembly or system corresponding to one or more embodiments.
Figure 8:
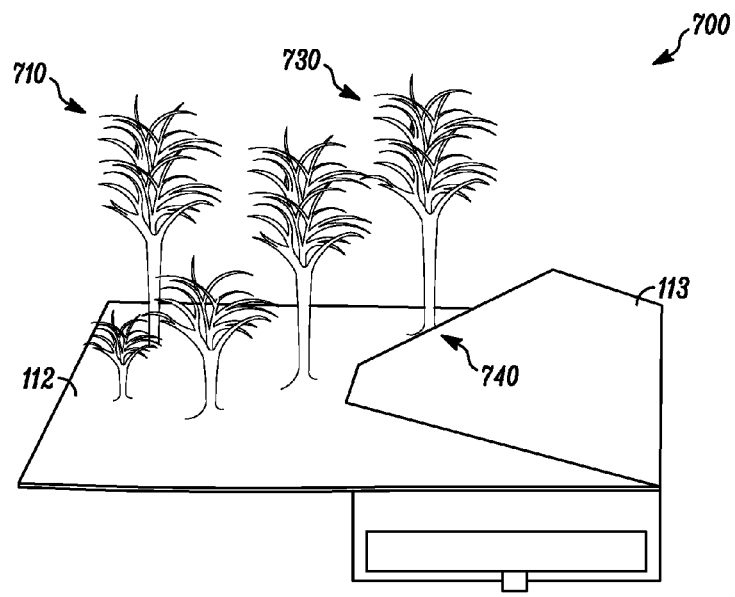
FIG. 8 is a perspective view of the FIG. 7 assembly or system in a partially closed configuration corresponding to one or more embodiments.

FIGS. 7 and 8 show respective top and front views of an alternative electronic device packaging system or assembly 700. Assembly 700 is similar to assembly 500, except for the inclusion of more detailed and intricate tree-type pop-up elements 710 and 720 on lid portions 112 and 113 and pop-up element 730 on device tray 115. A notch 740 in a lid portion 113 allows certain pop-up elements 730 to fold over lid portion 113 when the other lid portion 112 is closed.

Figure 9:
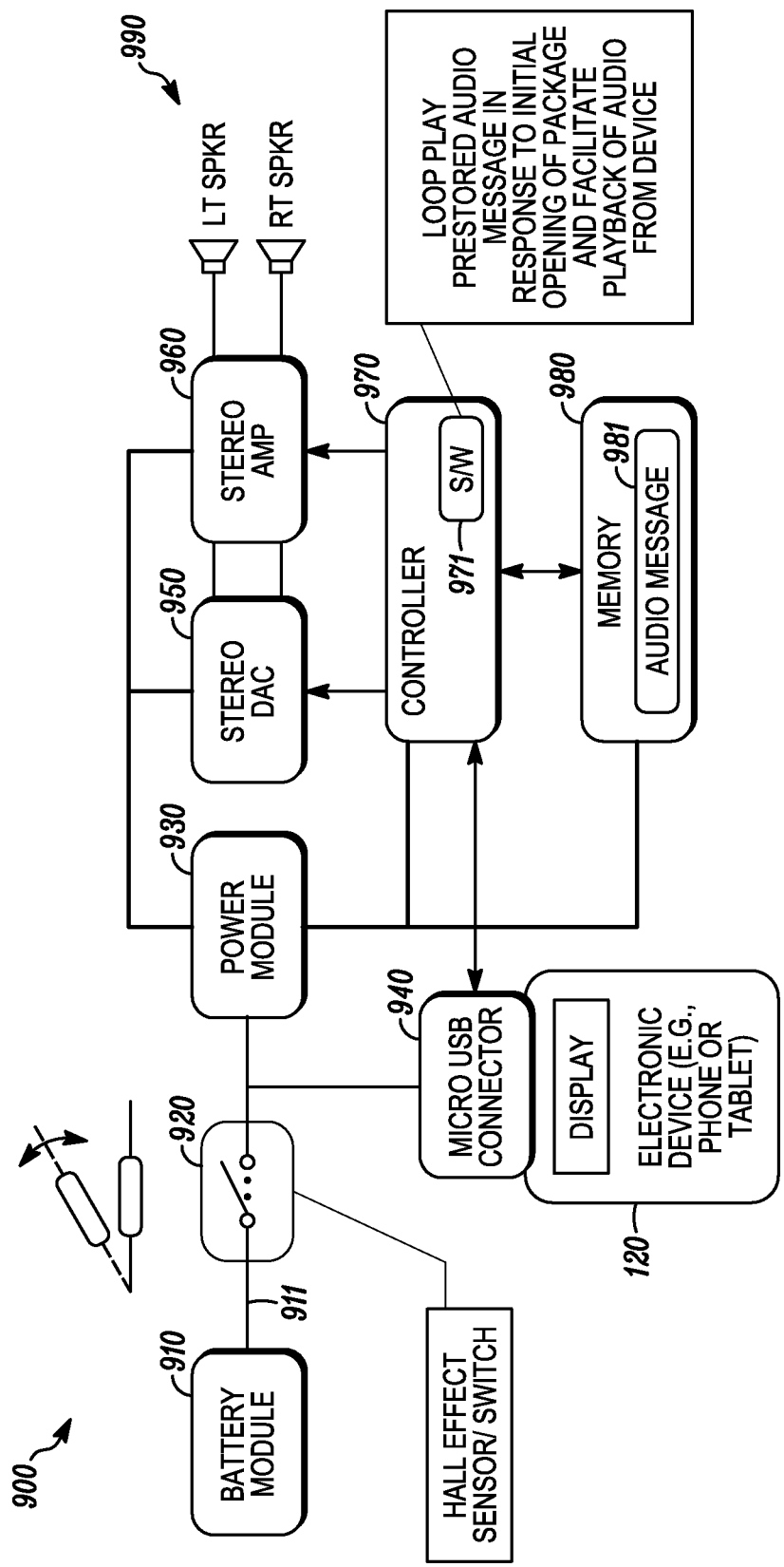
FIG. 9 is a block and circuit diagram of an electronic control system for an electronic device packaging assembly or system.

FIG. 9 shows example electrical circuitry 900 suitable for use in systems or assemblies 100, 500, and 700. Circuitry 900 includes a battery module 910, a sensor switch 920, a power module 930, a stereo digital-to-analog converter (DAC) 950, stereo amplifier 960, left and right audio transducers 990, a microcontroller 970, a memory module 980, and a Universal Serial Bus (USB) micro-connector 940 that can be coupled to the packaged electronic device 120. Battery module 910 includes one or more batteries, for example three AAA 1.5-volt batteries, and an upper battery terminal or node 911 coupled to sensor switch 920.

In the example embodiment, sensor switch 920 takes the form of a reed switch or Hall-effect or magnetic sensor switch. Sensor switch 920 (171 in FIGS. 2 and 3) is normally open in the presence of a sufficiently strong magnetic field, such as that from magnet 172 in lid portion 112, When the lid portion is in a closed position. Sensor switch 920 closes as the lid portion transitions from the closed position to its open position, coupling power from battery module 910 directly to the power module 930 and providing a wake-up signal via micro USB connector 940 to electronic device 120. (In some embodiments, sensor switch 920 takes the form of a photoelectric switch, which closes in response to a sufficient increase in light level, eliminating the need for the magnet and Hall-effect sensor or reed switch. In still other embodiments, a camera within the electronic device can used similarly to trigger activation of the electronic device.)

When the packaged electronic device 120 receives a wake-up signal, the device can turn on and display an electronic image or video that is visible through an opening 114A in the device cover flap 114, an opening 112H, 113H in one or both lid portions 112, 113, and/or an opening in a sleeve (not shown) that may be positioned over the packaging assembly 100. If no device cover flap 114 is implemented in a particular embodiment, the other openings 112H, 113H, etc. may be used to provide a view to the electronic image or video being displayed on the packaged electronic device 120.

Power module 930 supplies regulated power to stereo DAC 950, adjustable-gain stereo amplifier 960, microcontroller 970, and memory module 980. In response to receiving power from power module 930, microcontroller 970 initiates playback of a digital audio message 981 stored in memory module 980 through DAC 950, amplifier 960, and let and right audio transducers 990 (172 and 173 in FIGS. 1-4), in accord with stored machine-readable and executable instructions 971 (soft- or firmware). Instructions 971 include a loop structure which plays the stored audio message, for example a 5-, 10-, or 15-second musical greeting, a predetermined number of times, such as 1, 2, or 3 times, before terminating. The instructions also enable the microcontroller 970 to respond to audio and related volume control signals provided via micro USB-connector 940 or via an output audio jack connection from electronic device 120, allowing assembly 100 to function as self powered extension speakers. In the example embodiment, the message is played only the first time the box is opened. However, in some embodiments, the stored audio message 981 is played every time the box is opened and in still other embodiments, the message is played every Nth time the box is opened, for example, every $3^{rd}$, $4^{th}$ or $5^{th}$ time. Some embodiments include a switch which allows the user to defeat the automatic playback function.

Example Device

Figure 10:
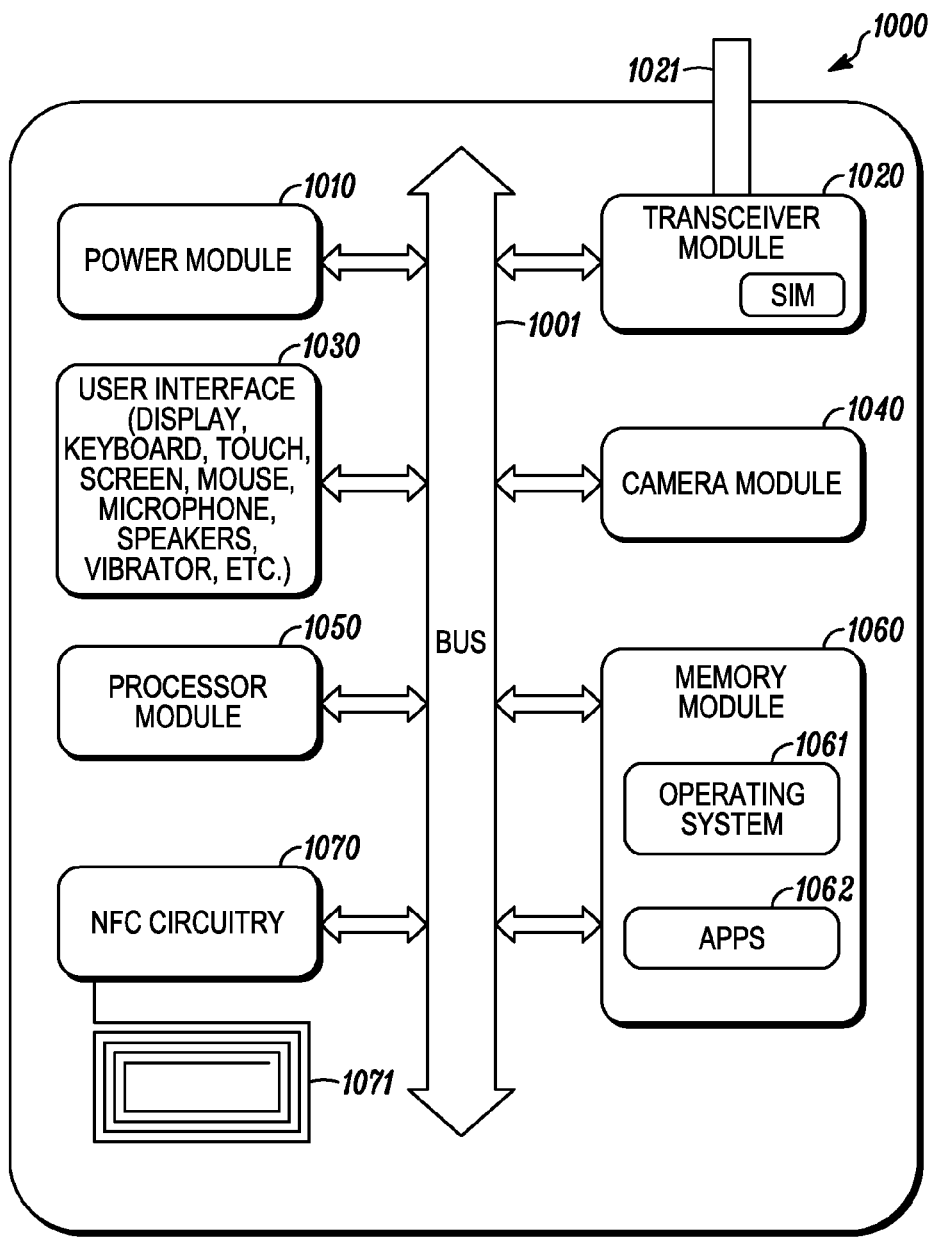
FIG. 10 is a block diagram of an electronic device corresponding to one or more embodiments.

FIG. 10 shows an example electronic device 1000 for use within system or assembly 100, 500, or 700. Electronic device 1000 is generally representative of a personal computer, desktop computer, laptop computer, tablet computer, workstation, personal digital assistant, smart phone, mobile telephone, handheld navigation device, global positioning receiver, gaming system, media playback device, remote controller, electronic toy, or any electronic device having an electronic display. Specifically, electronic device 1000 includes a central bus 1001 which interconnects a power module 1010, a transceiver module 1020, a user interface module 1030, a camera module 1040, a processor module 1050, a memory module 1060, and Near Field Communication (NFC) circuitry 1070.

Power module 1010 includes components and circuitry for providing power to various components of the electronic device 1000. In the example embodiment, module 1010 includes a power supply, one or more batteries, battery-charging circuitry, and an AC adapter module and plug (none of which are shown separately in the figure).

Transceiver module 1020 includes one or more transceivers, transmitters, and/or receiver circuits for enabling communications with external devices, systems, and/or networks via available communications protocols. Some embodiments include circuitry for enabling personal area, local area, wide area, or metropolitan area wireless communications via one or more of the following protocols: GSM (Global System for Mobile Communications), Bluetooth, WiFi, WiMAX, GPS (Global Positioning System), LTE (Long Term Evolution), and UMTS (Universal Mobile Telecommunications System). Transceiver module 1020 may also include one or more antennae 1021, which are configured according to any known or developed structures for radiating and/or receiving electromagnetic energy as desired for one or more of the wireless transceivers, transmitters, and/or receiver circuits.

User interface module 1030 includes one or more displays, one or more microphones, keyboards, alpha-numeric keyboard, pointing devices, isolated buttons, soft and/or hard keys, touch screens, jog wheel, and/or any other known input device. Additionally, user interface module includes one or more alert elements such as a loudspeaker, electronic display, and/or vibrator for creating audible, visible, and/or tactile alerts.

Camera module 1040 includes one or more light or optical sensors, for example in the form of one or more gridded array of image sensors. In some embodiments, the multiple image sensors are arranged to collect data from opposite directions, such as on the front and rear major surfaces of an apparatus housing. In some embodiments, camera module 1040 can be operated in a low-power state to detect a change in ambient light conditions resulting from opening a retail package, such as one disclosed herein, enclosing electronic device 1000.

Processor module 1050 includes one or more processors, processing circuits, or controllers. In the example embodiment, processor module 1060 takes any convenient or desirable form.

Memory module 1060 takes the example form of one or more electronic, magnetic, or optical data-storage devices stores code (machine-readable or executable instructions.) Specifically, memory module 1060 stores code for operating system module 1061 and applications module 1062.

In the example embodiment, operating system module 1061 takes the form of a conventional operating system (OS), such as Google Chrome OS, Android OS, Apple OS X, Apple iOS, Microsoft Windows, Microsoft Windows Mobile, or Linux.

Applications module 1062 includes one or more applications, such as a digital music player, picture viewer, or video player. In the example embodiment, the digital music player can output audio signal through a USB socket or audio output jack to circuitry incorporated on to a retail package assembly 100. Additionally, it can control the volume and provide equalization functions for the audio playback circuitry in the retail package assembly. If an electronic display 121 of the packaged electronic device 120 is activated, the image may be visible through at least a portion of the retail package assembly 100.

NFC circuitry 1070 not only senses and decodes induced electrical signals supplied by its antenna 1071, but can also excites antenna with appropriate electrical signals. In one example embodiment, circuitry 1070 continually polls for presence of an NFC tag mounted to lid portion 112 or 113 (in FIGS. 1-8). Detection of the tag indicates that the package is still closed and the status of the device remains unchanged, whereas a failure to detect the tag indicates that the package has been opened and the status of the device is changed to a wake-up or startup status.

CONCLUSION

This document, which incorporates the drawings and the appended claims, describes one or more specific embodiments of one or more inventions. These embodiments, offered not to limit but only to exemplify and teach the invention(s), are shown and described in sufficient detail to enable those skilled in the art to implement or practice the invention(s). Thus, where appropriate to avoid obscuring the invention(s), the description may omit certain information known to those of skill in the art.

This document describes specific embodiments of one or more inventions. However, one of ordinary skill in the art appreciates that various modifications and changes can be made without departing from the scope of the invention(s) as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The scope of any invention described herein is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, some embodiments can be implemented as a computer-readable storage medium having computer readable code stored thereon for programming a computer (e.g., including a processor) to perform a method as described and claimed herein. Likewise, computer-readable storage medium can include a non-transitory machine readable storage device, having stored thereon a computer program that include a plurality of code sections for performing operations, steps or a set of instructions.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of operating a device at least partially enclosed within a retail package, the retail package including an audio playback circuit with a tactile transducer, the device having a digital display and an operational state, the method comprising:
   in response to an opening of at least a portion of the retail package:
      automatically changing the operational state of the device,
      automatically causing the audio playback circuit to play, and
      activating the tactile transducer to vibrate a surface of the retail package to generate an audible signal.

2. The method of claim 1, wherein the retail package has a top portion having first and second overlapping folds, and wherein the opening of at least the portion of the retail package comprises:
   opening at least one of the first and second overlapping folds.

3. The method of claim 1, wherein automatically changing the operational state of the device includes causing the digital display to display an image.

4. The method of claim 1, wherein the device includes a mobile telephone and automatically changing the operational state of the device includes changing the operational state of the mobile telephone from an off or standby state to an on or active state.

5. The method of claim 1, wherein the device includes a touch-screen controller coupled to the digital display and automatically changing the operational state of the device includes activating the touch-screen controller.

6. The method of claim 1, wherein the audio playback circuit includes a memory circuit storing a representation of the audible signal, and wherein the method further comprises:
deactivating a playback circuit in response to completing playback of the stored audible signal.

7. The method of claim 1, wherein the portion of the retail package includes a magnet and wherein automatically changing the operational state of the device includes:
sensing separation of the magnet from a Hall effect sensor or reed switch and changing the operational state in response to the sensing.

8. The method of claim 1, wherein automatically changing the operational state of the device includes:
sensing a change in light level at an image sensor;
activating the digital display in response to sensing the change in light level; and
causing playback of a recorded audio message.

9. A retail package assembly for an electronic device having a digital display, the retail package assembly comprising:
a first structure having a space for receiving the electronic device;
a second structure configured to move relative to the first structure;
a sensor for sensing a condition based on a movement of the second structure from a first position to a second position;
a tactile transducer mounted to the first structure; and
circuitry for activating the tactile transducer and the electronic device in response to the sensor sensing the condition based on the movement of the second structure.

10. The retail package assembly of claim 9, further comprising:
audio playback circuitry for providing an audio signal from the electronic device to the tactile transducer in response to the sensor sensing the condition.

11. The retail package assembly of claim 10, wherein the audio playback circuitry includes memory for storing an audio file.

12. The retail package assembly of claim 9, wherein the circuitry for activating the tactile transducer and the electronic device includes a wireless transmitter for communicating with a wireless receiver within the electronic device.

13. The retail package assembly of claim 9, wherein the circuitry for activating the tactile transducer and the electronic device includes a conductor having one end for connection to a socket on the electronic device.

14. The retail package assembly of claim 9, further comprising:
a third structure configured for movement relative to the first structure, with the second structure overlapping the third structure.

15. The retail package assembly of claim 14, wherein the second structure and the third structure are flaps hinged to respective first and second sides of the first structure.

16. The retail package assembly of claim 15, wherein the first and second sides of the first structure are opposing sides.

17. The retail package assembly of claim 15, wherein at least one of the flaps includes a pop-up feature which pops up in response to opening a flap.

18. The retail package assembly of claim 9, wherein the second structure includes an opening for exposing at least a portion of the digital display of the electronic device when the electronic device is positioned within the space.

19. The retail package assembly of claim 9, wherein the sensor includes a reed switch or a Hall-effect sensor and the second structure includes a magnet positioned proximate the reed switch or the Hall-effect sensor when the second structure is in the first position.

20. The retail package assembly of claim 9, wherein the sensor is a light sensor and wherein the movement of the second structure from the first position to the second position exposes the sensor to more light.

21. A system comprising:
an electronic device having a digital display;
a retail package including:
a first structure at least partially containing the electronic device and exposing at least part of the digital display;
a second structure configured to move relative to the first structure; and
a sensor for sensing a condition based on a movement of the second structure from a first position to a second position;
a tactile transducer mounted to the first structure of the retail package; and
audio playback circuitry for providing an audio signal to the tactile transducer in response to the sensor sensing the condition and for selectively playing audio from the electronic device.

22. The system of claim 21, wherein the retail package further includes:
a pull-out drawer assembly for storing one or more accessories for the electronic device.

23. The system of claim 21, wherein the retail package further includes:
a pop-up feature configured to pop-up in response to the movement.

24. The system of claim 21, further comprising:
circuitry for activating the electronic device in response to the sensor sensing the condition based on the movement.

25. The system of claim 21, wherein the sensor is a Hall-effect sensor and the second structure includes a magnet positioned proximate the Hall-effect sensor when the second structure is in the first position.

26. The system of claim 21, wherein the sensor is a light sensor and wherein the movement of the second structure from the first position to the second position exposes the sensor to more light.

* * * * *